(12) United States Patent
Suaya

(10) Patent No.: US 8,410,628 B1
(45) Date of Patent: Apr. 2, 2013

(54) VEHICLE MOUNTED ENERGY AIRFLOW CONVERSION APPARATUS

(76) Inventor: Emilio Suaya, Miami, FL (US)

( * ) Notice: Subject to any disclaimer, the term of this patent is extended or adjusted under 35 U.S.C. 154(b) by 549 days.

(21) Appl. No.: 12/623,700

(22) Filed: Nov. 23, 2009

(51) Int. Cl.
*F03D 9/00* (2006.01)
(52) U.S. Cl. .......................................... 290/55; 290/44
(58) Field of Classification Search .............. 290/44, 290/55
See application file for complete search history.

(56) References Cited

U.S. PATENT DOCUMENTS

| | | | |
|---|---|---|---|
| 4,423,368 A * | 12/1983 | Bussiere | 322/35 |
| 6,700,215 B2 * | 3/2004 | Wu | 290/44 |
| 7,215,037 B2 * | 5/2007 | Scalzi | 290/55 |
| 8,167,533 B2 * | 5/2012 | Lucy et al. | 415/4.2 |
| 2008/0042446 A1 * | 2/2008 | Kurtz | 290/55 |

* cited by examiner

*Primary Examiner* — Michael Zarroli
(74) *Attorney, Agent, or Firm* — Gold & Rizvi, P.A.; Glenn E. Gold

(57) ABSTRACT

An electrical generating system includes a series of turbine generator assemblies installed within a system housing. The generator assemblies include a turbine assembly attached to a generator assembly. Airflow across the turbine assembly drives the generator assembly. The electrical power generated is transferred to a power management unit via a series of electrical conductors. The turbine assemblies are configured having less than half of a turbine wheel exposed externally from the system housing, allowing the turbines to be driven by passing airflow.

10 Claims, 12 Drawing Sheets

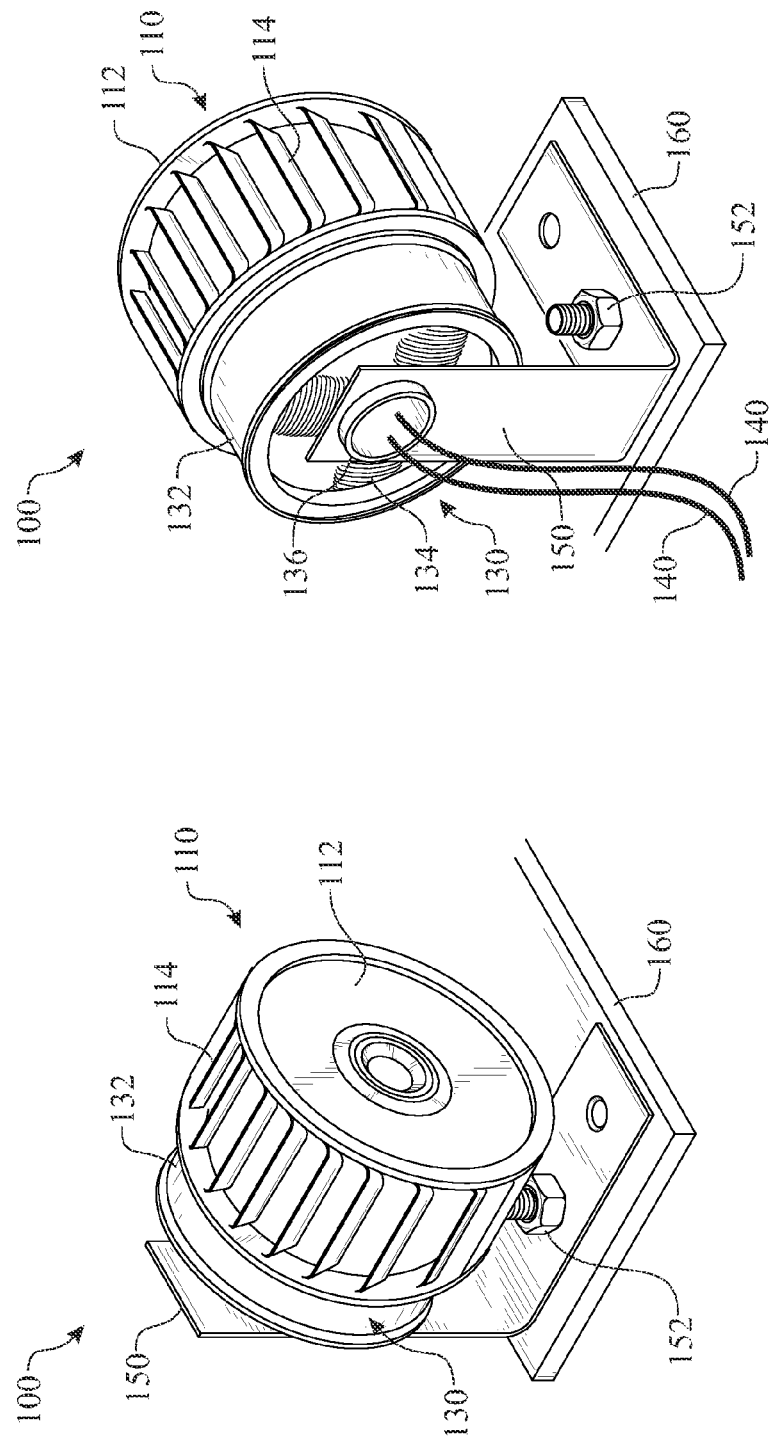

VEHICLE MOUNTED ENERGY AIRFLOW CONVERSION APPARATUS

FIELD OF THE INVENTION

The present invention relates to an airflow driven electrical generator for a moving vehicle. More particularly, the present invention relates to an airflow driven electrical generator for a moving vehicle, which provides increased efficiency and reduced drag.

BACKGROUND OF THE INVENTION

Efficient and cost effective transportation by a vehicle, whether by motor vehicle, train, airplane or boat, has become very important. Conserving energy and achieving the maximum benefit from the energy available is very important in achieving these goals. Sources of energy for use in propelling transportation vehicles continue to be a focus for development. Automobiles are evolving from fossil fuels to other fuel sources, such as hybrids using fossil fuels and electrical power, electrical power, hydrogen, fuel cells, and the like.

Focusing on electrical power and hybrids, there has been some significant effort in recent years to produce effective electrically powered automotive vehicles. Electrically powered vehicles utilised electrical energy stored in a series of batteries. The capacity of the stored energy is proportional to the distance per charge. Any generation of electrical energy between wired recharges increases the potential travel distance. A first known means for generating electrical energy is by obtaining energy from the rotational motion of the axles during braking. A second known means for generating electrical energy is by converting solar energy to electrical energy using roof mounted solar panels.

Several systems utilise the power of wind or air rushing over and around the vehicle to generate electrical energy. One such configuration utilises a belt having a series of blades projection therefrom. The belt extends between a generator and a tensioning pulley. One of the two sides of the belt is exposed to airflow, wherein the wind flow causes the belt to rotate. The belt in turn rotates the generator creating electrical energy. The belts are not an efficient means for converting airflow to a rotational motion. The belt drives a single generator that has a large inertial force that must be overcome.

A second configuration utilizes a series of blades assembled radiating from an axle. The axle is in communication with a generator via a drive belt. A shield is provided along a leading edge of the blade assembly directing any airflow towards one side (the upper edge) of the blade assembly. The airflow causes the blade assembly to rotate, driving the generator, which creates the electrical energy. The system utilizes a single generator, encountering the same efficiency limitations as noted in the first configuration.

A third configuration locates a blade assembly within a grill of a vehicle. The blade assembly engages with a generator. The airflow causes the blade assembly to rotate, driving the generator, which creates the electrical energy. Airflow is limited when passing through a grill. The majority of the airflow is directed around the grill, over the vehicle.

A fourth configuration locates a series of airflow ducts to gather and direct the airflow across a turbine, which engages with a respective generator to create electrical energy. This configuration encounters flow losses when the air is passing through the ducting. The system is difficult to install and maintain, as the ducting is preferred to flow from the front of the vehicle through, exiting the rear of the vehicle.

Each of the above identified configurations utilizes a single generator for producing electrical energy. The airflow is captured in some manner to create mechanical motion. The mechanical motion is communicated with a generator.

There is a desire for such electric vehicles to be efficient and to maximize the possible trip mileage available before recharging of batteries and the like. Therefore, an efficient power generating system that converts airflow to electrical energy is desired.

SUMMARY OF THE INVENTION

The present disclosure is generally directed to a device and respective method of use for converting airflow encountered by a moving vehicle into storable and usable electrical energy.

In some embodiments, the wind driven electrical energy generating system may include:
  a series of turbine generator assemblies, each turbine generator assembly comprising a turbine wheel engaged with a shaft of a generator;
  a system housing comprising a leading edge, a trailing edge, and a pair of side extending between the leading edge and the trailing edge, wherein the edges extend upwards from a base forming a system receiving cavity;
  at least one mount assembling each of the turbine generator assemblies to said system housing, wherein said mount positions each turbine generator assembly within the system receiving cavity exposing less than half of the diameter of the turbine wheel outside of the system receiving cavity; and
  an electrical conduit providing electrical connectivity between each of the turbine generator assemblies to a power management device.

In another aspect of the present invention, the housing includes a leading edge cover used for directing the airflow towards an exposed portion of the turbine wheels.

In still another aspect, the series of turbine generator assemblies are oriented to rotate about a horizontally arranged axis.

In yet another aspect, the series of turbine generator assemblies are oriented to rotate about a vertically arranged axis.

While yet another aspect utilises a single row of turbine generator assemblies.

In yet another aspect, the wind driven electrical energy generating system comprises a plurality of rows of turbine generator assemblies.

Regarding another aspect, the wind driven electrical energy generating system comprises a pair of rows of turbine generator assemblies, wherein the turbine wheels are oriented to rotate about a vertically arranged axis and one row comprises turbine wheels arranged to rotate clockwise and a second row comprises turbine wheels arranged to rotate counterclockwise.

In a still further aspect, the wind driven electrical energy generating system comprises a mounting interface for securing the housing to a vehicle. One such mounting can be magnetic.

In another aspect, the housing comprises an upper surface wherein the turbines project through an aperture provided through the upper surface.

Continuing with another aspect, the system further comprises at least one battery.

These and other aspects, features, and advantages of the present invention will become more readily apparent from the attached drawings and the detailed description of the preferred embodiments, which follow.

BRIEF DESCRIPTION OF THE DRAWINGS

The invention will now be described, by way of example, with reference to the accompanying drawings, where like numerals denote like elements and in which:

FIG. 1 presents an isometric view of the generator and turbine wheel including the mounting bracket shown from the turbine side;

FIG. 2 presents an isometric view of the generator and turbine wheel including the mounting bracket shown from the generator side;

Like reference numerals refer to like parts throughout the various views of the drawings.

DETAILED DESCRIPTION OF THE INVENTION

Figure 3:
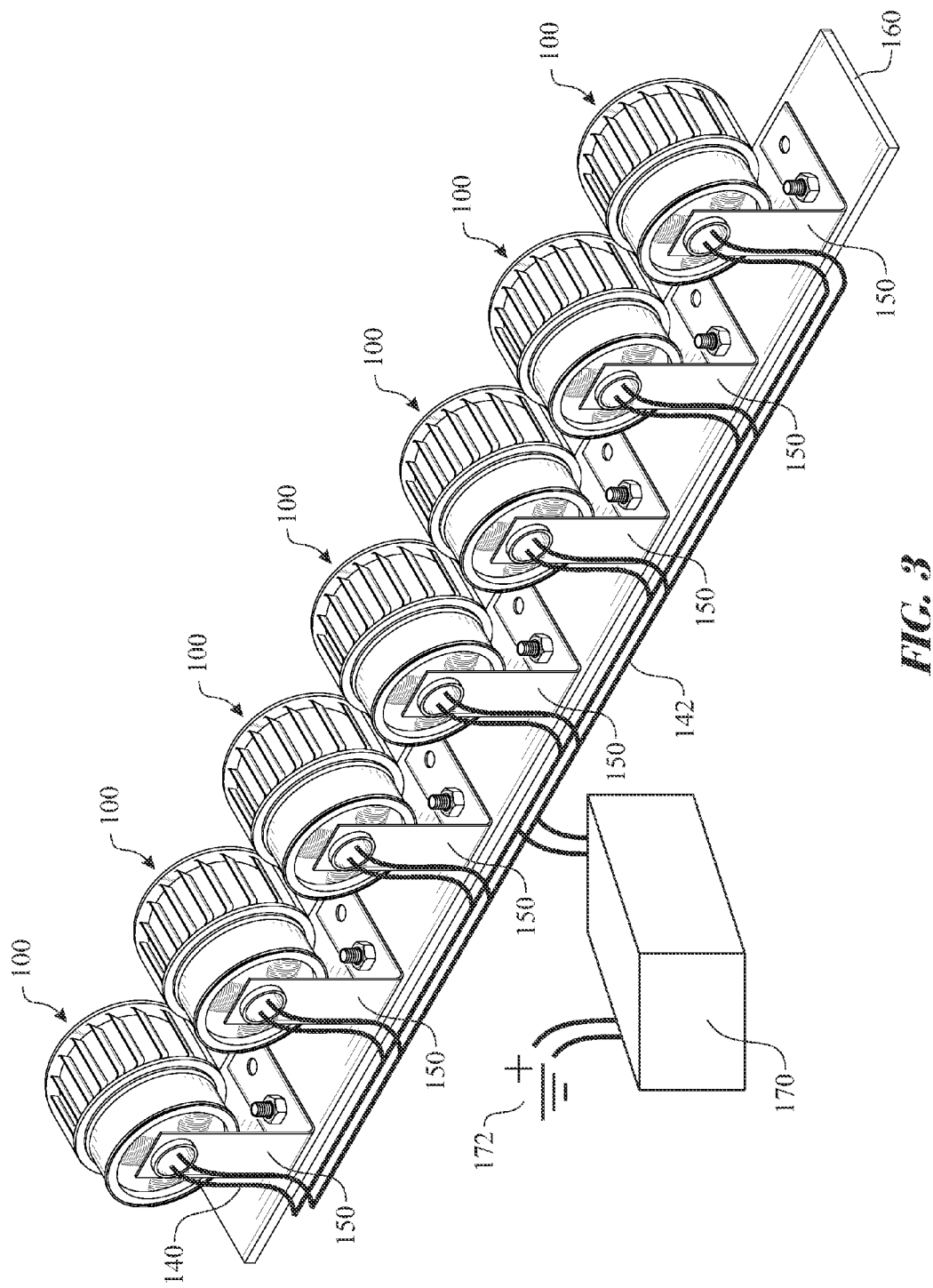
FIG. 3 presents an isometric view of multiple generators in a vertical orientation viewed from the generator side.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 5. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The present invention utilizes a series of turbine generator assembly 100 for generating electrical energy by harnessing airflow passing across a moving vehicle. The turbine generator assembly 100 is described in FIGS. 1 and 2, with an assembly comprising a series of turbine generator assemblies 100 illustrated in FIGS. 3 and 4. The turbine generator assembly 100 comprises two components, a turbine assembly 110 and a generator assembly 130. The turbine assembly 110 is symmetrically attached to the generator assembly 130 about a turbine axle 136, wherein the assembly rotates about the longitudinal axis of the turbine axle 136. The turbine assembly 110 is formed having a series of turbine blades 114 spanning between a pair of turbine frames 112. The turbine frames 112 are preferably shaped having a circular peripheral edge, being symmetric about the turbine axle 136. The turbine blades 114 are preferably located proximate a periphery of the turbine frames 112 and oriented parallel to the turbine axle 136. The turbine blades 114 are designed to at least partially capture any passing airflow causing the turbine assembly 110 to rotate about the turbine axle 136. The generator assembly 130 comprises elements commonly associated with a generator, including a generator housing 132, a generator windings 134 and respective magnets, stators, and the like. The generator can comprise a pair of generator electrical conductors 140 providing a generic electrical circuit; a single generator electrical conductor 140 output, wherein the housing provides a common electrical interface; or a plurality of generator electrical conductors 140 for multiple voltage outputs.

Figure 4:
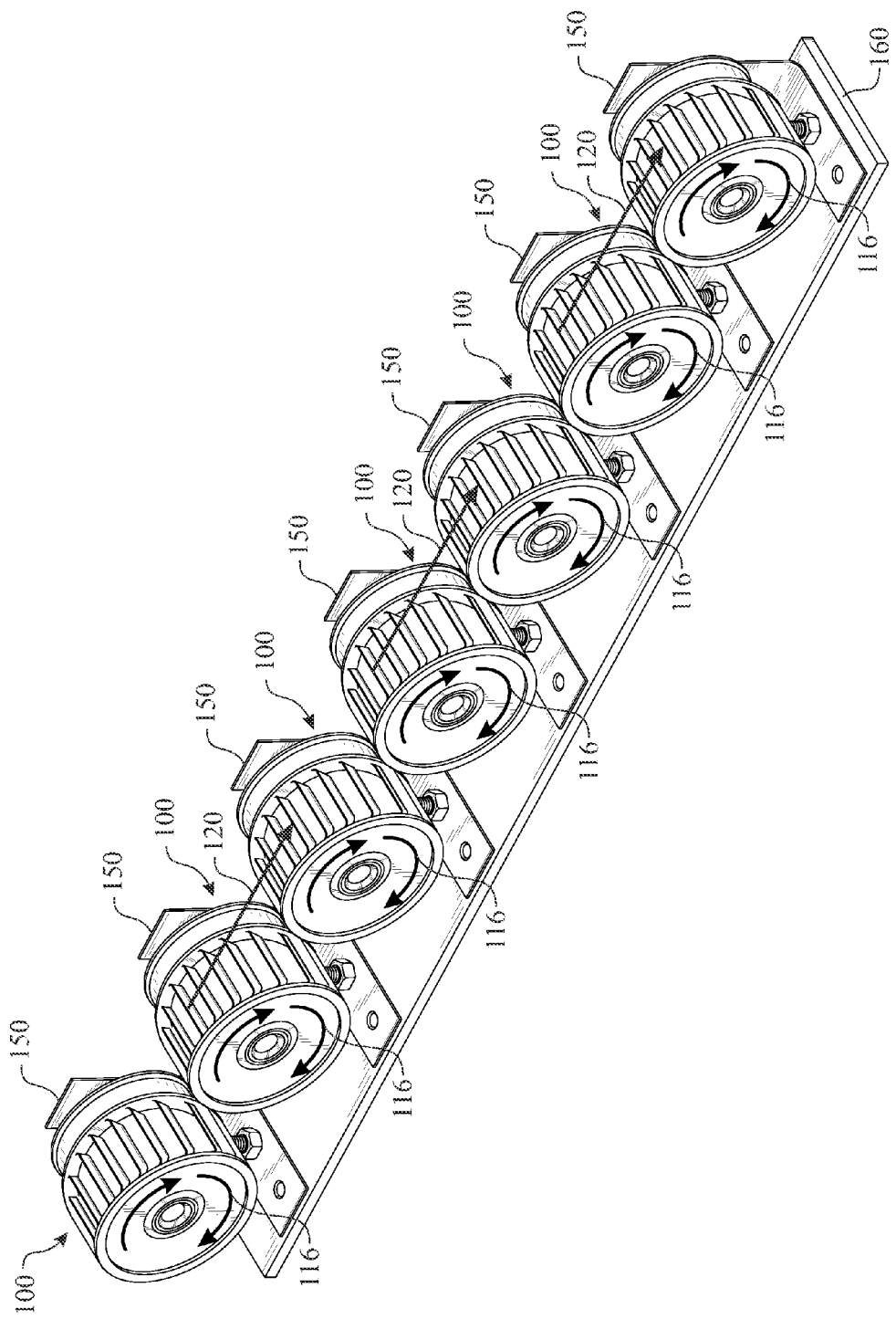
FIG. 4 presents an isometric view of multiple generators in a vertical orientation viewed from the turbine side.

The turbine generator assembly 100 is mounted to a mounting frame member 160 via a turbine generator mounting bracket 150. The form factor of the turbine generator mounting bracket 150 can be of any design understood by those skilled in the art. The turbine generator mounting bracket 150 can be secured to the turbine generator assembly 100 via the turbine axle 136, the generator housing 132 or any other reasonable member that does not impact the operability of the turbine generator assembly 100. The turbine generator mounting bracket 150 can be assembled to the mounting frame member 160 via any mechanical interface design, such as mounting hardware 152 as illustrated. Alternate assembly interfaces such as mechanical snap designs, twist lock interfaces, rivets, welding, soldering, mechanical entrapping interfaces, and the like can be utilised. A series of turbine generator assemblies 100 are mounted to the mounting frame member 160 in a parallel, linear relationship as illustrated in FIGS. 3 and 4. Each of the generator electrical conductors 140 can be connected into a single circuit via power collecting conductors 142, wherein the power collecting conductors 142 transfer the generated electrical energy from each turbine generator assembly 100 to a power management unit 170. The managed power output is then transferred to a battery 172 or series of batteries for power storage. The turbine generator assemblies 100 are generally unidirectional (the arrows indicate the turbine rotation 116) and therefore oriented respective to the direction of airflow 120.

Figure 5:
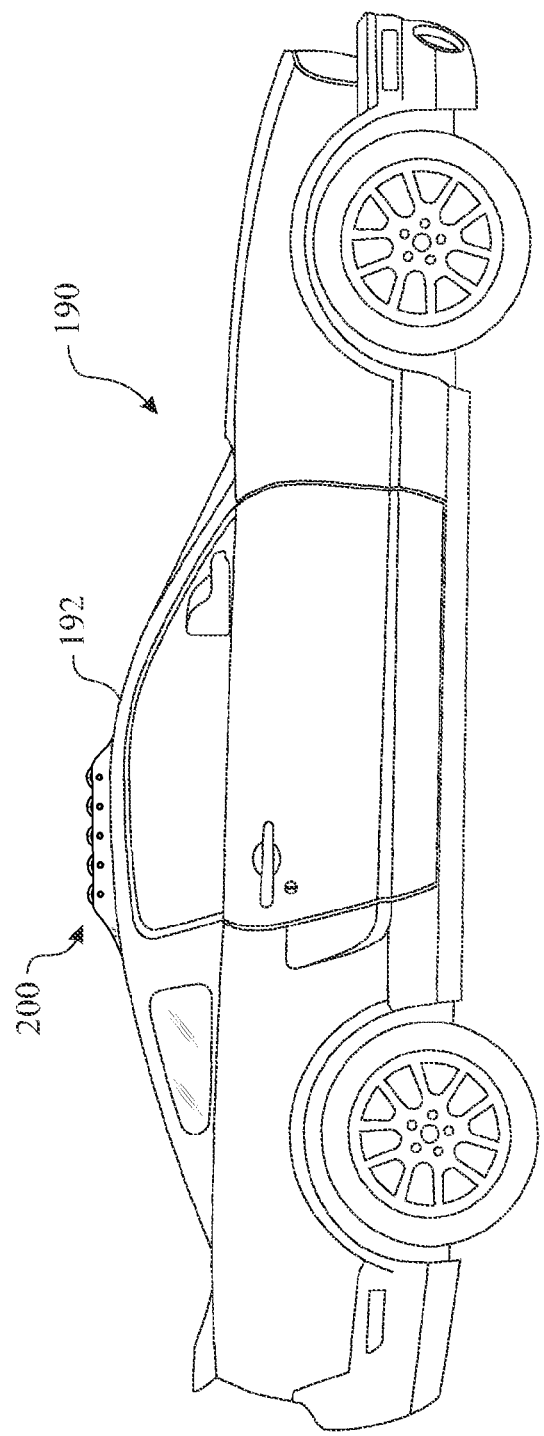
FIG. 5 presents a side elevation view of a vehicle comprising a top airflow operated turbine generator assembly mounted upon a roof of the vehicle.

A first exemplary embodiment of the present invention is referred to as a top airflow turbine generator assembly 200 and is illustrated in use in FIG. 5. The top airflow turbine generator assembly 200 is attached to a roof 192 of a vehicle 190. It is understood that the top airflow turbine generator assembly 200 can be assembled at any reasonable location exposed to airflow while the vehicle 190 is traveling. Additionally, the top airflow turbine generator assembly 200 can be integrated into panels of the vehicle.

Figure 6:
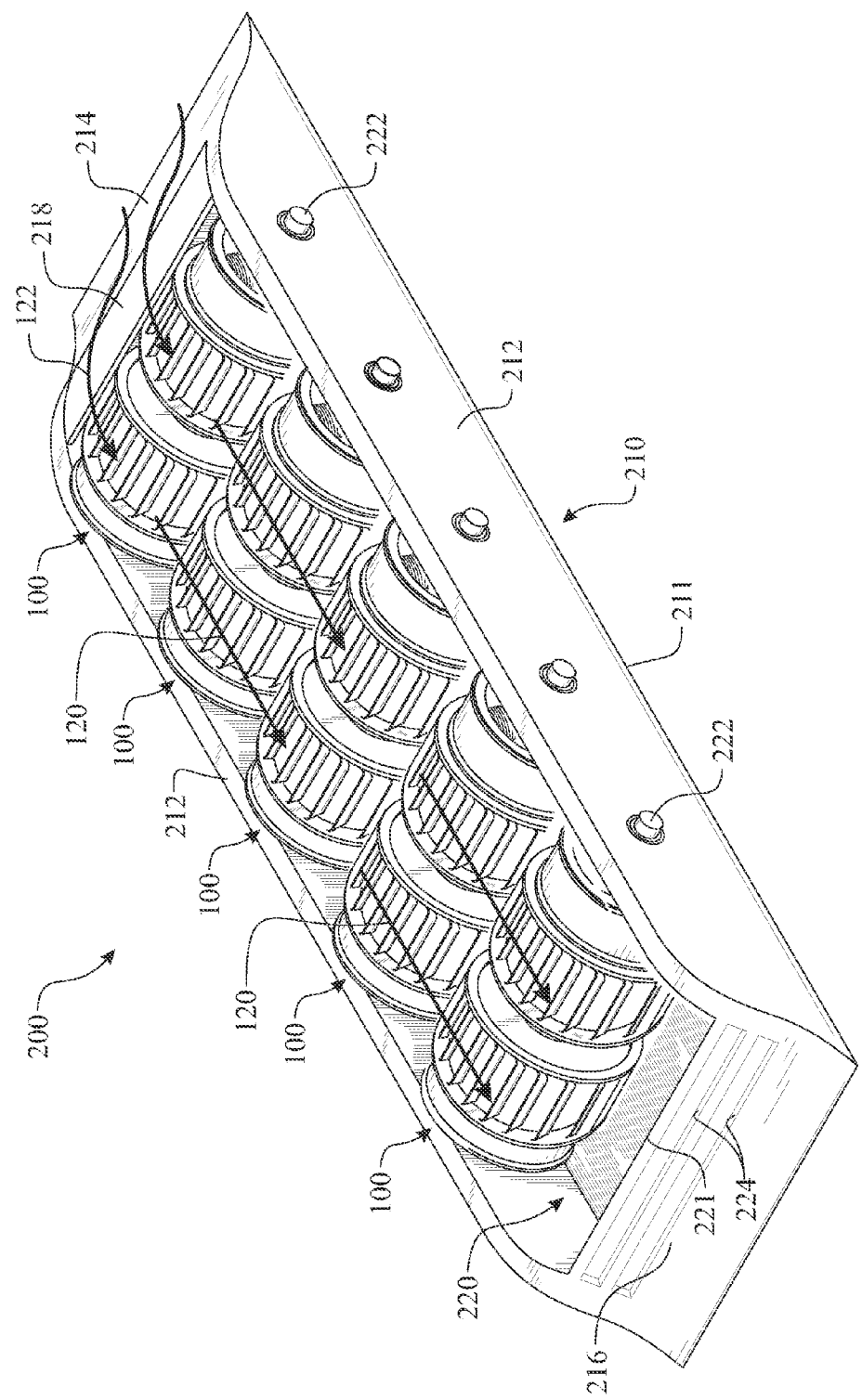
FIG. 6 presents an isometric view of the top airflow operated turbine generator assembly.
Figure 7:
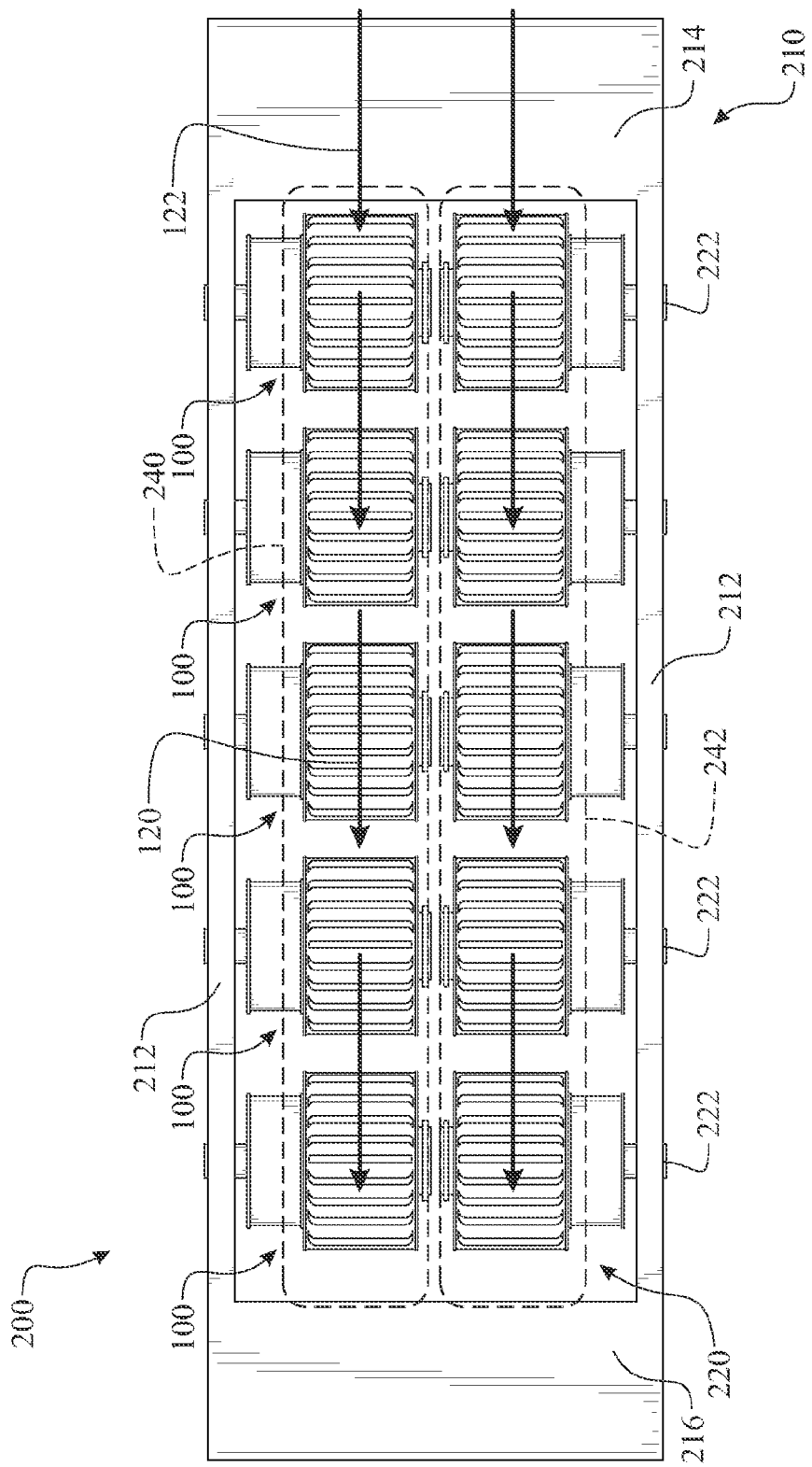
FIG. 7 presents a top planar view of the top airflow operated turbine generator assembly of FIG. 6.
Figure 8:
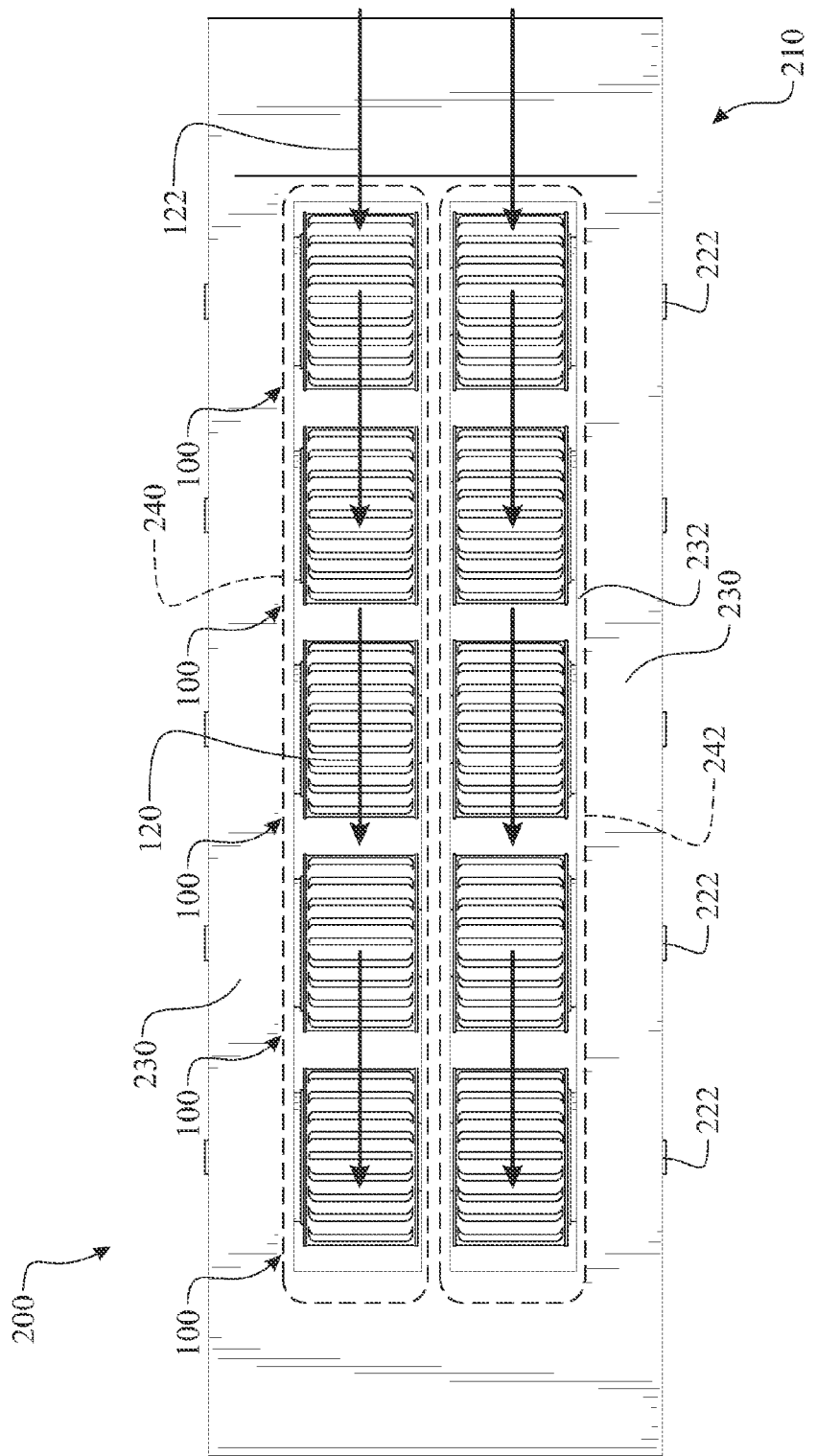
FIG. 8 presents a top planar view of a modified top airflow operated turbine generator assembly comprising a top surface cover member.
Figure 9:
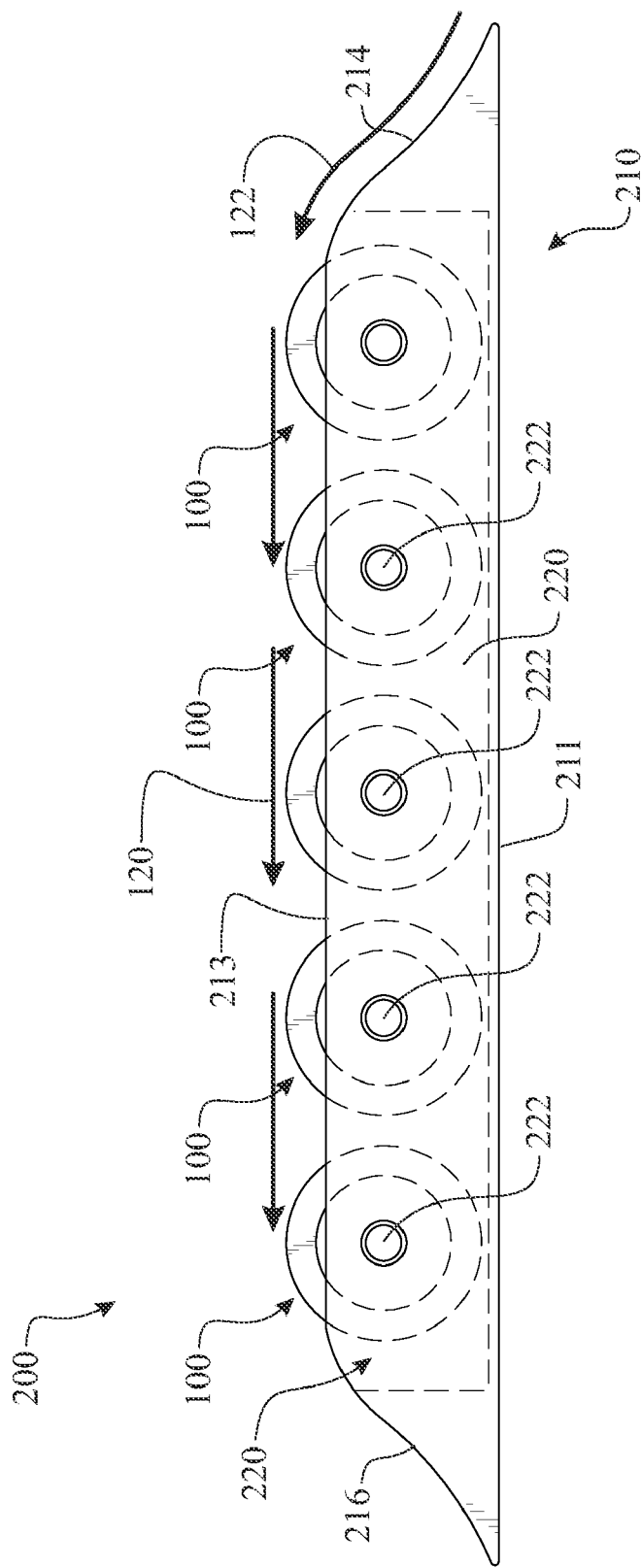
FIG. 9 presents a side elevation view of the top airflow operated turbine generator assembly of FIG. 6.

The top airflow turbine generator assembly 200 is detailed in the illustrations presented in FIGS. 6 through 8. The top airflow turbine generator assembly 200 comprises a series of turbine generator assembly 100 assembled to a system housing 210. The system housing 210 is formed having a series of upward extending members provided about a periphery of a housing base 211. The upward extending members include a pair of housing sidewalls 212 provided along each of two elongated edges of the housing base 211. A housing leading wall 214 is provided along a leading edge of the housing base 211 between the leaded edges of the housing sidewalls 212. The housing leading wall 214 is preferably aerodynamically designed to direct an in feed airflow 122 towards the turbine blades 114 of the turbine generator assembly 100. An optional leading edge cover 218 can be attached between the housing leading wall 214 and the closest turbine generator assemblies 100 to further aid in directing the airflow 122 as desired. A housing trailing wall 216 is provided along a trailing edge of the housing base 211 between the trailing edges of the housing sidewalls 212. The housing trailing wall 216 can include an opening 221 or a series of vents 224 allowing the top airflow 120 to discharge. The operable components of the top airflow turbine generator assembly 200 are assembled substantially within a system receiving cavity 220. The system receiving cavity 220 is defined as an interior formed by the upward extending members and the housing base 211. The turbine generator assemblies 100 can be assembled to the system housing 210 via a series of mounting axles 222. The turbine generator assemblies 100 are positioned within the system housing 210 wherein less than ½ of a diameter of the turbine assembly 110 projects beyond an upper edge 213 of the system housing 210. This configuration allows the top airflow 120 to engage with the turbine blades 114 of the turbine assembly 110, causing the turbine assemblies 110 to rotate in accordance with the turbine rotation 116. The rotation of the turbine assembly 110 drives the respective generator assembly 130 causing an electrical output. The electrical output is collected via the power collecting conductors 142 and is then transferred to the power management unit 170. The power management unit 170 regulates the power output and transfers an acceptable voltage/amperage to the battery 172.

An optional top surface cover member 230 can be assembled to the upper edges of the top airflow turbine generator assembly 200, minimizing any undesirable airflow, which would create drag. The top surface cover member 230 would comprise apertures 232. The turbine assembly 110 passes through the apertures 232, while the top surface cover member 230 covers the balance of the operable components of the system, optimizing the aerodynamics of the top airflow turbine generator assembly 200.

The top airflow turbine generator assembly 200 can include a single row of turbine generator assemblies 100, two rows 240, 242 of turbine generator assemblies 100, wherein the turbine generator assemblies 100 of the first row 240 and second row 242 are preferably facing each other and counter rotating as illustrated, or a plurality of rows. The rows can be symmetric (as shown), evenly offset (alternating), or randomly spaced.

Figure 10:
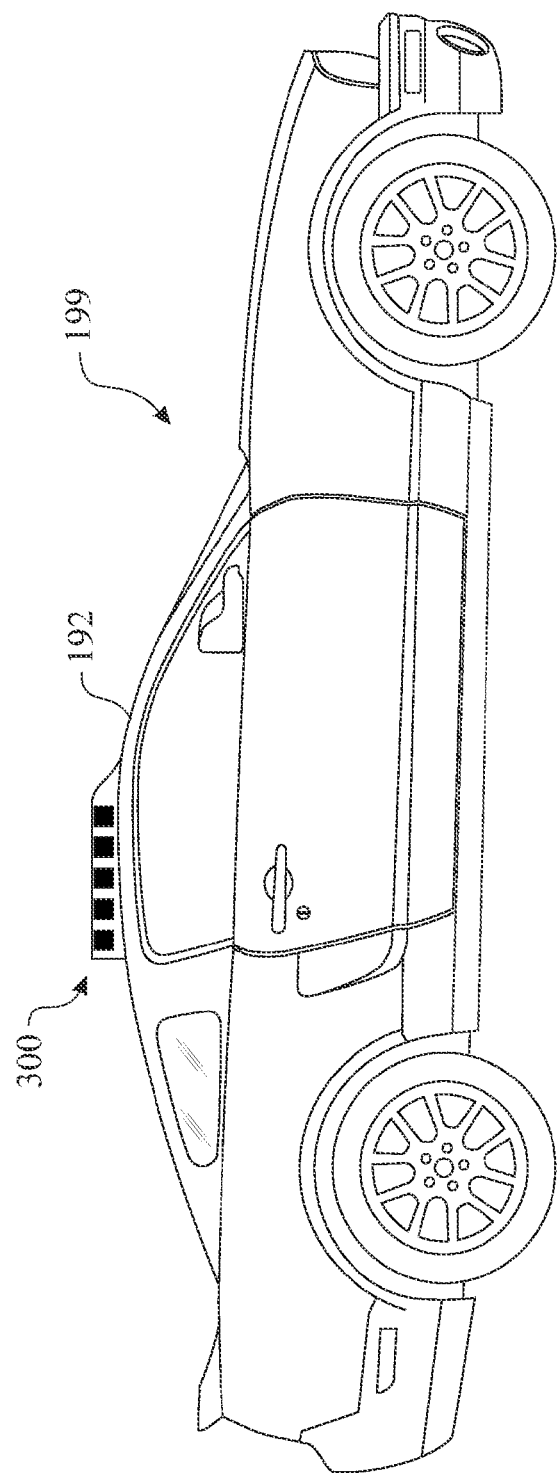
FIG. 10 presents a side elevation view of the vehicle comprising a side airflow operated turbine generator assembly mounted upon a roof of the vehicle.

A second exemplary embodiment of the present invention is referred to as a side airflow turbine generator assembly 300 and is illustrated in use in FIG. 10. The side airflow turbine generator assembly 300 is attached to a roof 192 of a vehicle 190. It is understood that the side airflow turbine generator assembly 300 can be assembled at any reasonable location exposed to airflow while the vehicle 190 is traveling. Additionally, the side airflow turbine generator assembly 300 can be integrated into panels of the vehicle.

Figure 11:
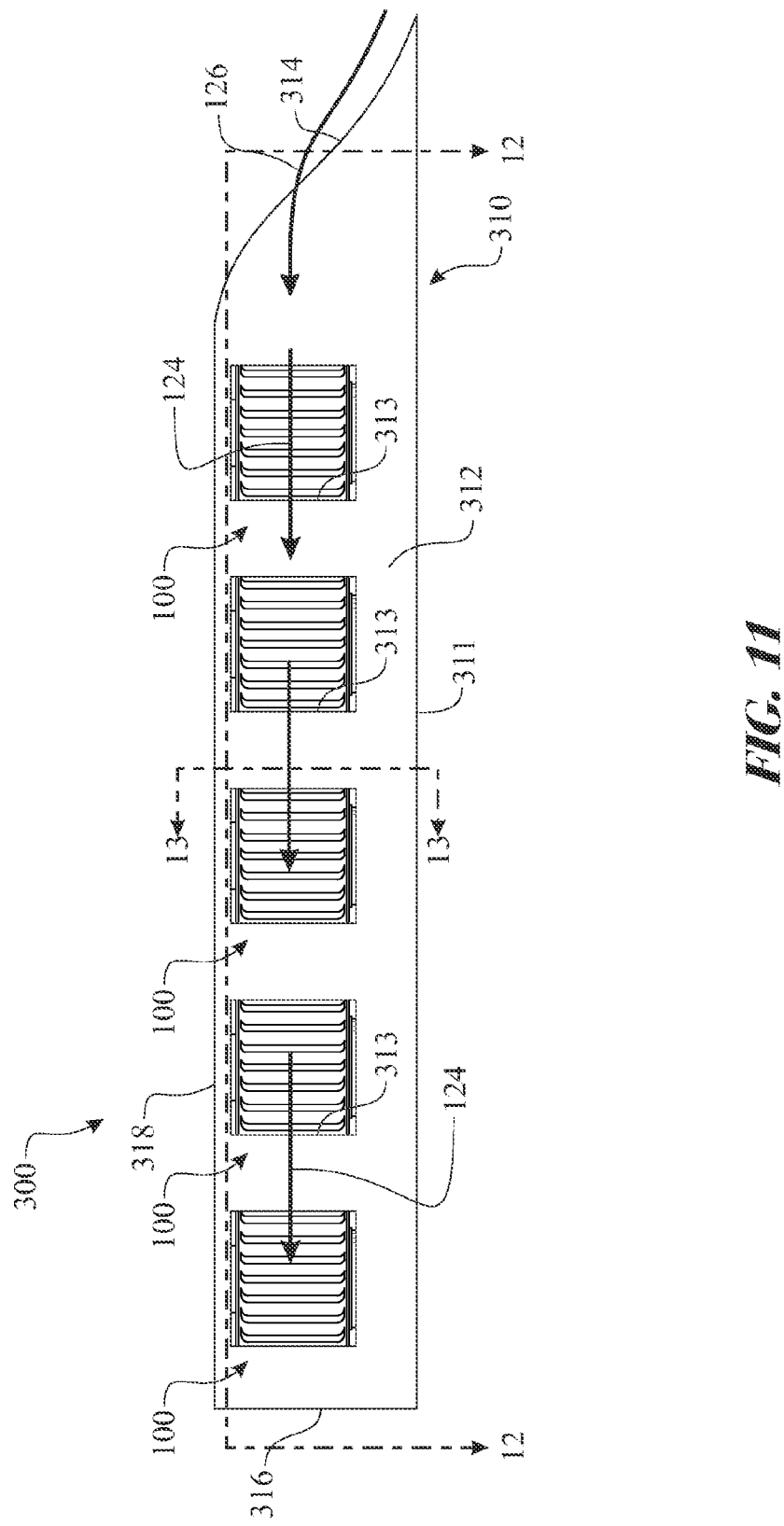
FIG. 11 presents a side elevation view of the side airflow operated turbine generator assembly.
Figure 12:
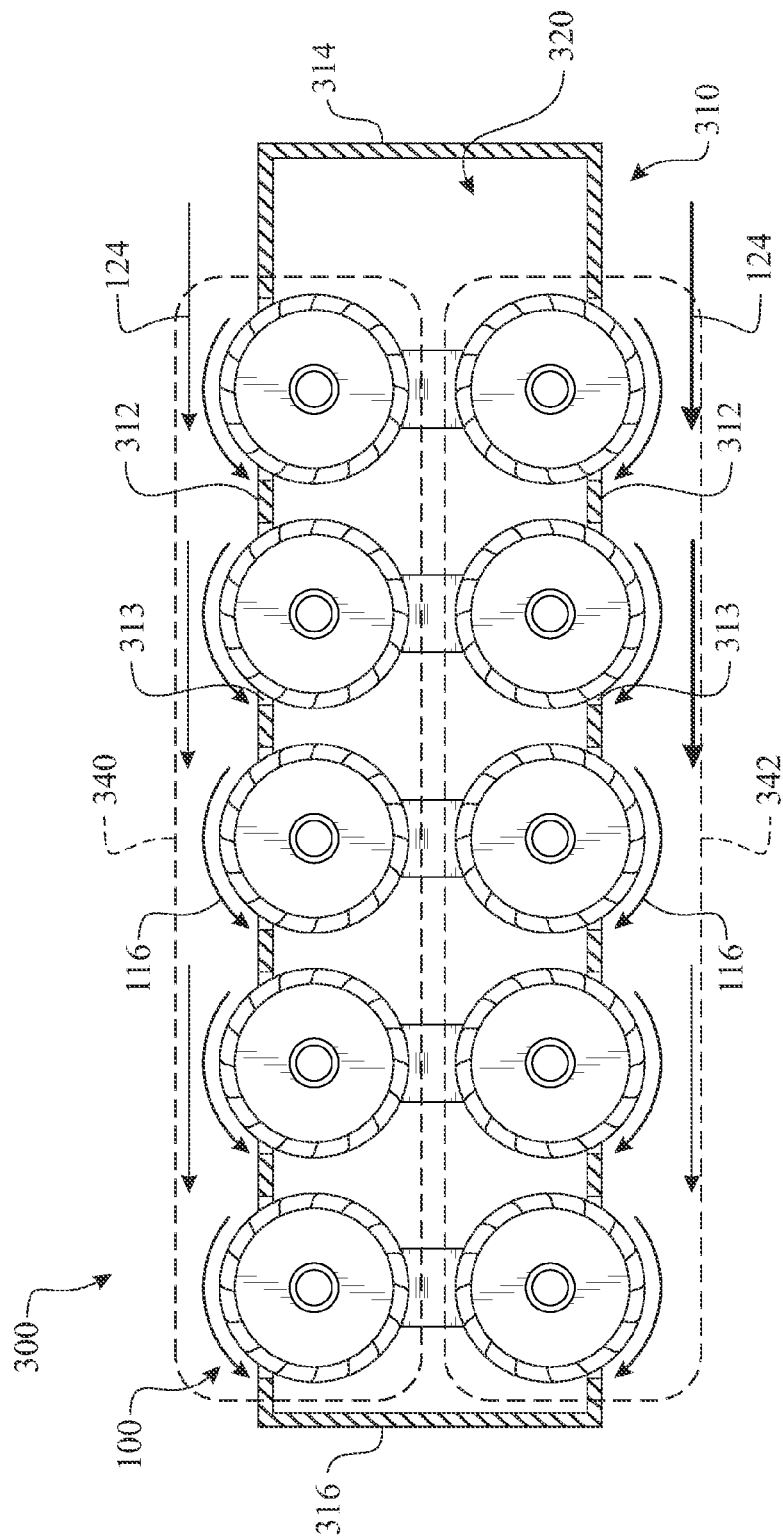
FIG. 12 presents a top sectional view of the side airflow operated turbine generator assembly of FIG. 11 taken along section line 12-12.
Figure 13:
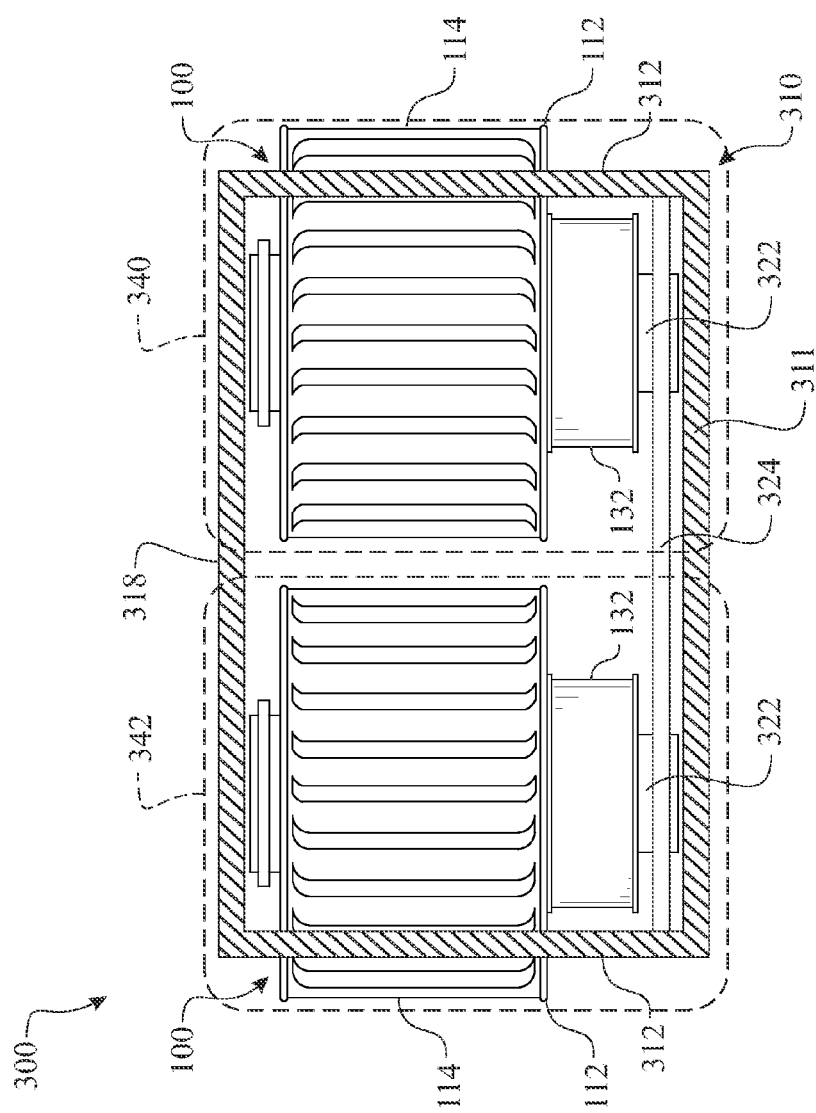
FIG. 13 presents a front sectional view of the side airflow operated turbine generator assembly of FIG. 11 taken along section line 13-13.

The side airflow turbine generator assembly 300 is detailed in the illustrations presented in FIGS. 11 through 13. The side airflow turbine generator assembly 300 comprises a series of turbine generator assemblies 100 assembled to a mounting plate 324 of a system housing 310. The system housing 310 is defined by a six-sided enclosure, creating a generator receiving cavity 320 therein. The system housing 310 comprises a housing base 311, a pair of housing sidewalls 312 extending vertically from the housing base 311, a housing leading wall 314, a housing trailing wall 316, and a housing roof. The housing leading wall 314 is preferably aerodynamically designed to direct an in feed airflow 126 towards the turbine blades 114 of the turbine generator assembly 100. A housing trailing wall 316 is provided along a trailing edge of the housing base 311 between the trailing edges of the housing sidewalls 312. The housing trailing wall 316 can include an opening or a series of vents allowing airflow within the generator receiving cavity 320 to discharge. The operable components of the side airflow turbine generator assembly 300 are assembled substantially within a generator receiving cavity 320. The turbine generator assembly 100 can be assembled to the housing base 311 or the mounting plate 324 via a series of mounting axles 322. The turbine generator assemblies 100 are positioned within the system housing 310 wherein less than ½ of a diameter of the turbine assembly 110 projects through a respective aperture 313, extending beyond a side exterior surface of the system housing 310 as best shown in FIG. 13. This configuration allows the side airflow 124 to engage with the turbine blades 114 of the turbine assembly 110, causing the turbine assemblies 110 to rotate per the turbine rotation 116. The rotation of the turbine assembly 110 drives the respective generator assembly 130 causing an electrical output. The electrical output is collected via the power collecting conductors 142 and forwards the power to the power management unit 170. The power management unit 170 regulates the power output and transfers an acceptable voltage/amperage to the battery 172.

The side airflow turbine generator assembly 300 can include a single row of turbine generator assemblies 100 or two rows 340, 342 of turbine generator assemblies 100, wherein the turbine generator assemblies 100 of the first row 340 and second row 342 are preferably facing each other and counter rotating as illustrated in FIG. 12. The rows 340, 342 can be symmetric (as shown), evenly offset (alternating), or randomly spaced.

The use of a series of smaller turbines increases the efficiency of the system, as the smaller units require less energy to drive their rotation. The electrical power generated from each of the plurality of turbine generator assemblies 100 is collected and managed through the power management unit 170, thus allowing the power to be safely transferred to the rest of the system. Additionally, the power management unit 170 may include a diode or other current flow controlling device to ensure power does not flow towards the generator assembly 130.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. An electrical generator assembly, comprising:
   a system housing comprising a leading wall, a trailing wall, and a pair of sidewalls, which create an system receiving cavity;
   a series of turbine generator assemblies, each turbine generator assembly comprising:
      an electrical generator encased within a generator housing,
      a turbine assembly comprising a turbine frame and a series of turbine blades, and
      a turbine axle rotationally assembled to the turbine assembly, allowing the turbine to rotate when exposed to airflow,
      wherein the turbine causes the generator to rotate and output electrical power; and
   an electrical conductor configuration that transfers electrical output from the series of turbine generator assemblies to a power management unit;
   wherein the series of turbine generator assemblies are arranged in a linear fashion of two rows,
   wherein the turbine axles are oriented horizontally and the two rows of the turbine assemblies are arranged in mirror image from one another wherein one row has a component on one side of the turbine generator assembly and that the other row has the similar component on the opposite side of a turbine generator assembly; and
   wherein the series of turbine generator assemblies are assembled to the system housing exposing less than half of diameter of the turbine assembly extending externally from the system housing through an upper edge of the system housing.

2. An electrical generator assembly as recited in claim 1, wherein the leading wall is shaped to direct airflow towards the exposed portion of the turbine assemblies.

3. An electrical generator assembly as recited in claim 1, wherein the series of turbine generator assemblies are arranged substantially parallel with the sidewalls.

4. An electrical generator assembly as recited in claim 1, wherein each row of the series of turbine generator assemblies is arranged substantially parallel with a longitudinal axis of the system housing.

5. An electrical generator assembly, comprising:
   a system housing comprising a leading wall, a trailing wall, and a pair of sidewalls, which create an system receiving cavity;
   a series of turbine generator assemblies, each turbine generator assembly comprising:
      an electrical generator encased within a generator housing,
      a turbine assembly comprising a turbine frame and a series of turbine blades, and
      a turbine axle rotationally assembled to the turbine assembly, allowing the turbine to rotate when exposed to airflow,
      wherein the turbine causes the generator to rotate and output electrical power; and
   an electrical conductor configuration that transfers electrical output from the series of turbine generator assemblies to a power management unit;
   wherein the series of turbine generator assemblies are arranged in two rows, each turbine generator assembly being oriented having the respective turbine axle oriented vertically and each row being arranged parallel to a longitudinal axis of the system housing,
   wherein the turbine assemblies extend through the sidewall, and
   wherein the turbine generator assemblies are assembled to the system housing exposing less than half of diameter of the turbine assembly extending externally from the system housing wherein the turbine assemblies of the first row extend through a first sidewall and the turbine assemblies of the second row extend through an opposite sidewall.

6. An electrical generator assembly as recited in claim 5, wherein the leading wall is shaped to direct airflow towards the exposed portion of the turbine assemblies.

7. An electrical generator assembly as recited in claim 5, wherein the series of turbine generator assemblies are arranged substantially parallel with the sidewalls.

8. An electrical generator assembly, comprising:
   a system housing comprising a leading wall, a trailing wall, and a pair of sidewalls, which create an system receiving cavity;
   a series of turbine generator assemblies, each turbine generator assembly comprising:
      an electrical generator encased within a generator housing,
      a turbine assembly comprising a turbine frame and a series of turbine blades, and
      a turbine axle rotationally assembled to the turbine assembly, allowing the turbine to rotate when exposed to airflow,
      wherein the turbine causes the generator to rotate and output electrical power; and
   an electrical conductor configuration that transfers electrical output from the series of turbine generator assemblies to a power management unit;
   wherein the series of turbine generator assemblies are arranged in a linear fashion of two rows, each row being parallel to a longitudinal axis of the system housing, and
   wherein the turbine generator assemblies are assembled to the system housing exposing less than half of diameter of the turbine assembly extending externally from the system housing,
   wherein the turbine axles are oriented vertically, wherein the turbine assemblies of a first row extend through a first sidewall and the turbine assemblies of a second row extend through an opposite sidewall, and the turbine assemblies of the first row rotate in a direction opposite the rotation of the turbine assemblies of the second row.

9. An electrical generator assembly as recited in claim 8, wherein the system housing further comprising a series of apertures exposing the turbine assemblies, while concealing the system receiving cavity from any excessive airflow.

10. An electrical generator assembly as recited in claim 8, wherein the system housing further comprising an airflow discharge in the trailing wall.

* * * * *